Dec. 3, 1963 J. A. O'BRIEN 3,113,204

PARITY CHECKED SHIFT REGISTER COUNTING CIRCUITS

Filed March 31, 1958 3 Sheets-Sheet 1

INVENTOR
J. A. O'BRIEN
BY Alan C. Rose
ATTORNEY

PARITY CHECKED SHIFT REGISTER COUNTING CIRCUITS

Filed March 31, 1958 3 Sheets-Sheet 2

INVENTOR
J. A. O'BRIEN
BY Alan C. Rose
ATTORNEY

INVENTOR
J. A. O'BRIEN
BY Alan C. Rose
ATTORNEY

3,113,204
PARITY CHECKED SHIFT REGISTER COUNTING CIRCUITS

Joseph A. O'Brien, New Providence, N.J., assignor to Bell Telephone Laboratories, Incorporated, New York, N.Y., a corporation of New York Filed Mar. 31, 1958, Ser. No. 725,212
7 Claims. (Cl. 235—153)

This invention relates to shift registers, and more particularly to circuits employing two or more shift registers.

In many data handling or data transmission systems, errors are checked through the use of redundant information. Typical schemes use an extra parity check digit for each group of information digits to make the total number of digits odd or even. Then, at the completion of the data handling operation, a change in parity indicates an error. For error detection purposes, the use of parity check digits is quite satisfactory, particularly because of the low ratio of check to information digits.

In the area of counting or encoding, however, the problem of checking is somewhat more difficult. As a binary counter is advanced, for example, the number of "1's" included in the counter changes in such a manner that independent circuitry for detecting errors in the operation of the counter would normally include the essential portions of a second counter.

Accordingly, an important object of the present invention is to improve and simplify self-checking counting and encoding circuits.

In accordance with the invention, the number of pulses received from an input source is registered as a code combination or "count" in at least two shift registers, and overall parity is maintained by changing the parity of two shift registers concurrently. More specifically, digits are progressively shifted through each of the shift registers, and each of the successive combinations of states of all of the stages of the shift registers represents a different arbitrary code combination or count. Following a predetermined number of steps, such as ten, for example, in the case of a decimal counter the shift registers are recycled to their initial states. Concerning the successive states of a given stage in a counter apparatus, it may be recalled that in a conventional binary counter the next successive state for any stage depends on the states of all stages representing digits of lesser significance in the counter. In the present apparatus, however, digits are merely shifted along the various shift registers, and a suitable logic circuit is employed at the input of each register to provide signals which satisfy the parity maintenance and distinctive code conditions mentioned above.

This above-noted parity is simply an expression of the odd or even nature of a number. More particularly, in the context of binary code groups stored in shift registers, parity may express the odd or even nature of the number of individual storage elements in a given storage state. Thus, odd parity exists in a register having an odd number of storage elements in a given state. Similarly, even parity exists in a register having an even number of storage elements in that given state.

Overall parity expresses the odd or even nature of the resultant sum of a plurality of numbers. By way of specific example, in two registers which respectively contain a number displaying an odd parity and a number displaying an even parity, an overall odd parity exists since the sum of the numbers of the respective storage elements in a given state in the two registers is an odd number. Alternatively, it may be said with regard to this specific example that odd parity exists between the two registers.

Maintenance of parity among numbers appearing in succession on the above-considered registers signifies the retaining of a fixed relation of oddness or evenness in the numbers themselves or in the number of elements in a given state in the successive register indicating conditions.

It is a feature of the invention that a counting or encoding circuit include at least two shift registers, a first input circuit for applying new signals to one of the shift registers, in accordance with the state of the registers, and another input circuit for applying signals to the other shift register to maintain parity in all of the stages of said two shift registers.

It is another feature of this invention that the count of the counting circuit be stored by digits in the stages of the two shift register circuits in accordance with predetermined distinctive code combinations, the input circuits changing the code combinations as the digits are shifted down the register stages so that overall parity between the two registers is maintained.

A complete understanding of this invention and of these and various other features thereof may be gained from consideration of the following detailed description and the accompanying drawing, in which.

Figures 1, 2:
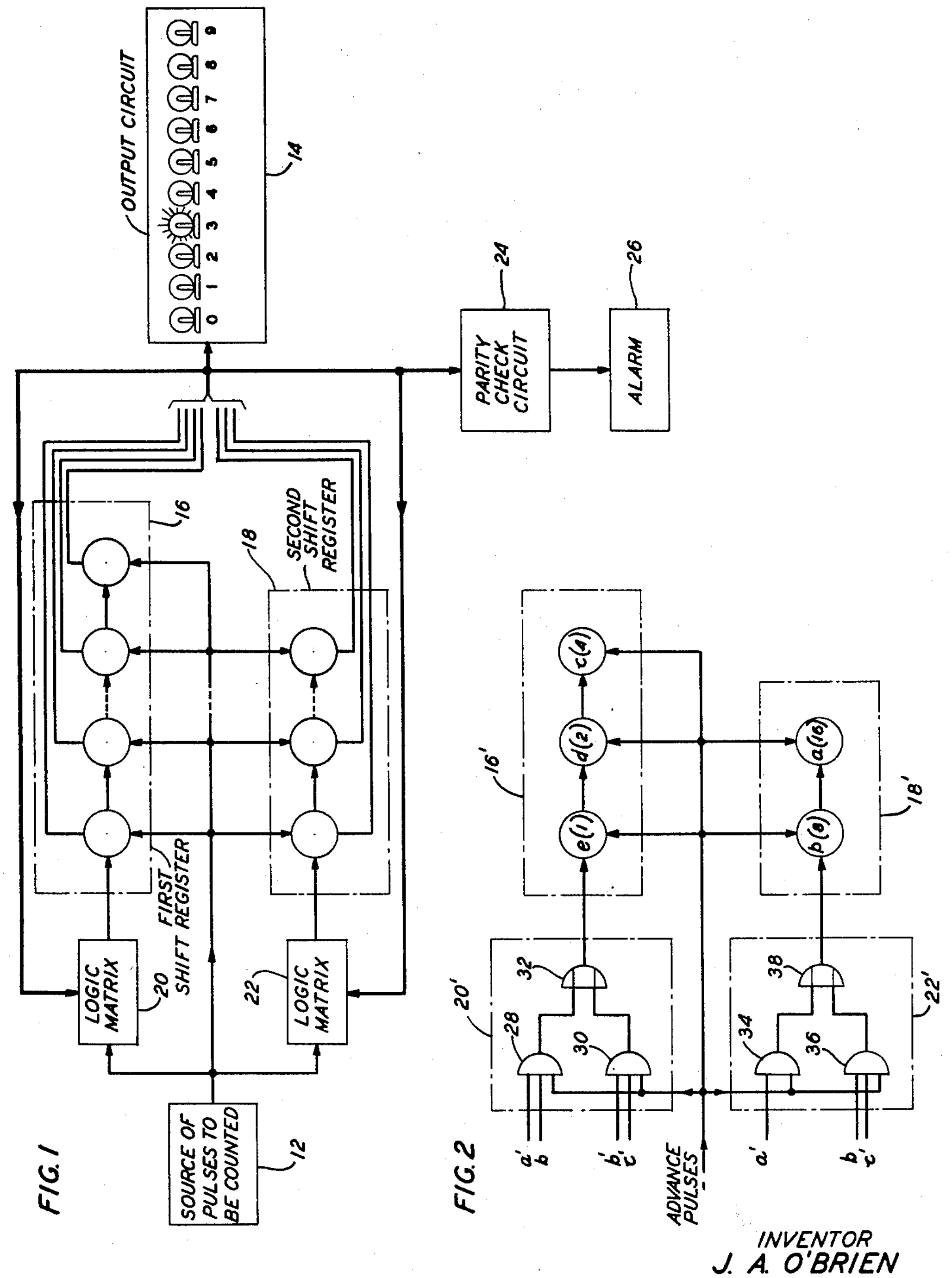
FIG. 1 is a block diagram of a data processing system employing the encoding or counting circuits of the present invention.
FIG. 2 is a logic circuit diagram of one encoding circuit in accordance with the present invention.
Figure 3:
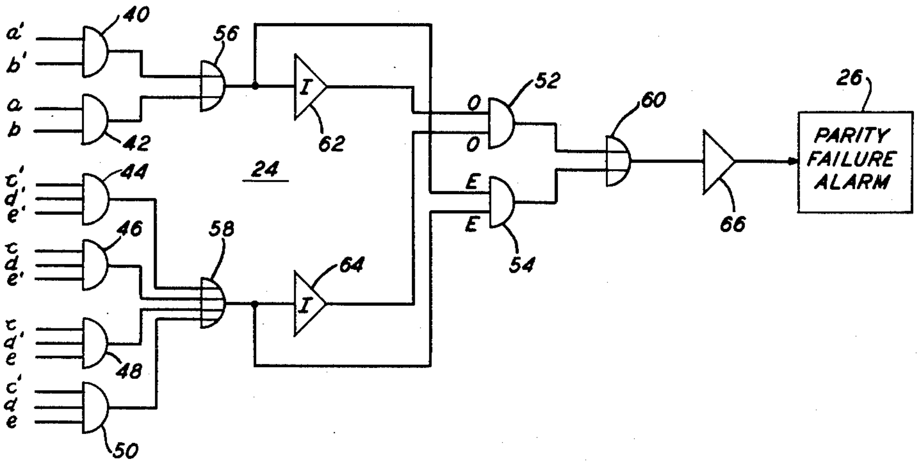
Figure 5:
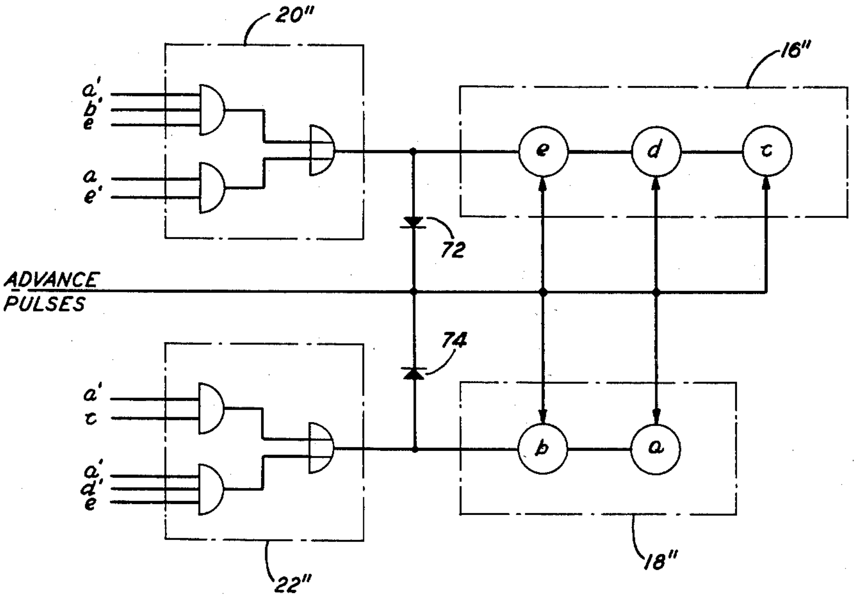
Figure 4:
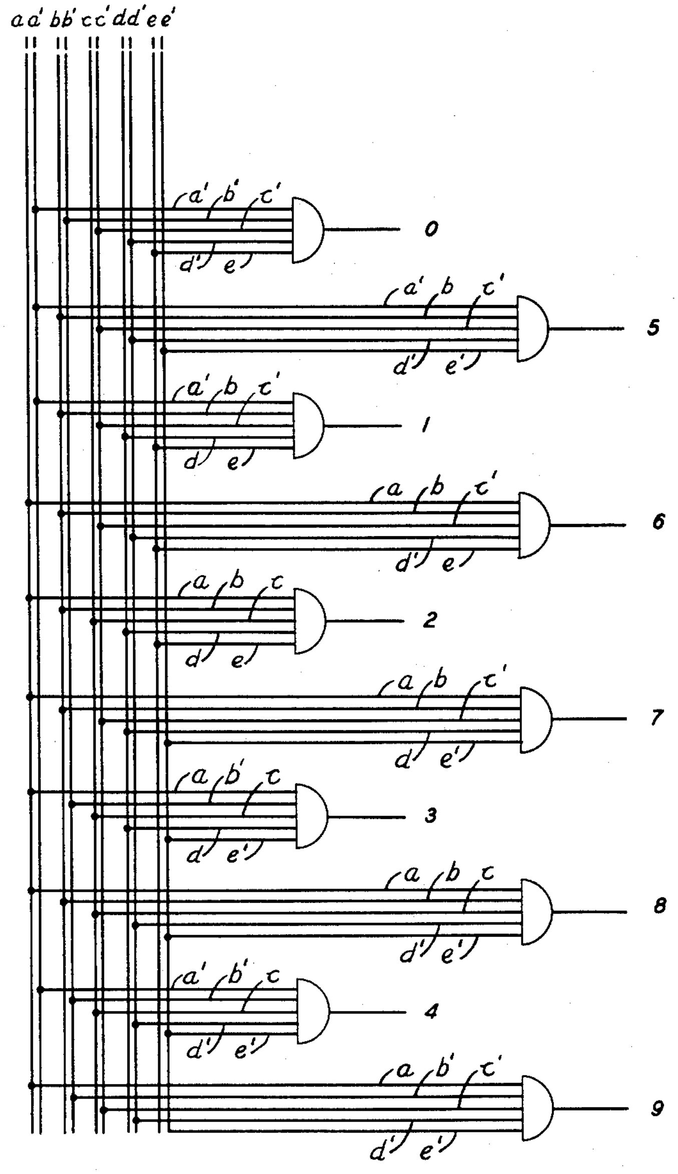

FIG. 3 constitutes a logic circuit diagram of a parity checking circuit which may be utilized in the circuit of FIG. 1;

FIG. 4 is a logic circuit diagram of a translation matrix which may be employed in the output circuit of FIG. 1; and FIG. 5 represents an alternative shift register and associated logic circuitry which may be employed in accordance with the present invention.

As disclosed in my patent application Serial No. 553,926, filed December 19, 1955, now Patent 3,014,656, issued December 26, 1961, a shift register may advantageously be employed in a counting or encoding circuit in many circumstances. In accordance with the present invention, it has been determined that circuitry including two or more shift registers enjoys many of the advantages of circuits having a single shift register for these purposes, and also permits a simple check on the operation of the circuitry.

FIG. 1 shows an illustrative embodiment of the invention in which two shift registers are employed. In FIG. 1, the number of pulses from the source 12 is indicated by the illumination of a selected light appearing as part of the output circuit 14. The output circuit 14 also includes a selection matrix responsive to a combination of signals from the shift register stages included in shift registers 16 and 18 to select a single light. The logic matrices 20 and 22 are coupled between the source of pulses 12 and the input to the first stage of each of the shift registers. These logic matrices are arranged to provide an orderly progression of states of the shift registers 16 and 18.

In the circuit of FIG. 1, the output leads from the various shift register stages are grouped together and the resulting group of leads is represented by a heavy line. As will be shown below, leads from all of the shift register stages are normally not connected to the matrices 20 and 22.

The parity check circuit 24 derives signals from all of the stages of both shift registers. Upon failure of parity, the alarm circuit 26 is energized, thus indicating a circuit malfunction.

In order to provide specific examples embodying the principles of the invention, a number of coding possibilities have been studied for a pair of shift registers, one having two stages and the other having three stages.

Considerations were further limited to those shift register sequences which recycled after ten progressive steps. The ten possible sequences of five binary digits or bits satisfying the foregoing conditions and preserving odd parity are set forth in the following Table I. Similarly, twelve sequences (not listed) preserve even parity and also satisfy the conditions noted above.

*Table I.—Odd Parity Sequences*

| Decimal Number | Five-Bit Sequences; Each Five-Bit "Word" is designated By Its Decimal Equivalent | | | | | | | | | |
|---|---|---|---|---|---|---|---|---|---|---|
| | A | B | C | D | E | F | G | H | J | K |
| 0 | 1 | 1 | 1 | 1 | 1 | 1 | 1 | 1 | 2 | 11 |
| 1 | 2 | 2 | 2 | 11 | 11 | 11 | 11 | 11 | 13 | 31 |
| 2 | 13 | 13 | 13 | 22 | 23 | 31 | 31 | 31 | 19 | 22 |
| 3 | 19 | 19 | 26 | 13 | 13 | 22 | 22 | 22 | 14 | 13 |
| 4 | 7 | 24 | 21 | 26 | 19 | 4 | 13 | 13 | 28 | 19 |
| 5 | 14 | 21 | 11 | 21 | 7 | 8 | 19 | 19 | 16 | 14 |
| 6 | 21 | 11 | 22 | 2 | 14 | 25 | 7 | 14 | 8 | 28 |
| 7 | 11 | 31 | 4 | 4 | 21 | 26 | 14 | 21 | 25 | 25 |
| 8 | 22 | 22 | 8 | 8 | 2 | 28 | 28 | 2 | 26 | 26 |
| 9 | 4 | 4 | 16 | 16 | 4 | 16 | 16 | 4 | 21 | 21 |

It turns out that the two sequences which are simplest to instrument are those designated D and F in Table I, with the sequence designated F producing a slightly simpler circuit than that designated D. Two specific illustrative counting or encoding circuits based on the sequences D and F set forth in Table I will be considered in detail below.

The circuit of FIG. 2 indicates one implementation of the shift registers 16 and 18 and the associated logic matrices 20 and 22 of FIG. 1. In the case of the circuit of FIG. 2, the progression of sequences is that indicated in column F of Table I. More clearly to bring out the significance of the sequences set forth in decimal form under column F of Table I, the successive sequences are rewritten in Table II in binary form for the shift register stages *a*, *b*, *c*, *d*, and *e* shown in FIG. 2.

*Table II.—Sequence F*

| Indicated Decimal Output Number | Shift Register Pattern | | | | | Decimal Equivalent of Binary Word |
|---|---|---|---|---|---|---|
| | (16) *a* | (8) *b* | (4) *c* | (2) *d* | (1) *e* | |
| 0 | 0 | 0 | 0 | 0 | 1 | 1 |
| 1 | 0 | 1 | 0 | 1 | 1 | 11 |
| 2 | 1 | 1 | 1 | 1 | 1 | 31 |
| 3 | 1 | 0 | 1 | 1 | 0 | 22 |
| 4 | 0 | 0 | 1 | 0 | 0 | 4 |
| 5 | 0 | 1 | 0 | 0 | 0 | 8 |
| 6 | 1 | 1 | 0 | 0 | 1 | 25 |
| 7 | 1 | 1 | 0 | 1 | 0 | 26 |
| 8 | 1 | 1 | 1 | 0 | 0 | 28 |
| 9 | 1 | 0 | 0 | 0 | 0 | 16 |
| | Shift Register 18′ | | Shift Register 16′ | | | |

In examining FIG. 2 and Table II, it should be noted that digits are shifted in shift register 16′ from shift register stage *e* through stage *d* to stage *c*, and in shift register 18′ they are shifted from stage *b* to stage *a*. In Table II this shifting action progresses from right to left, with successive rows of the table representing successive states of the shift registers 16′ and 18′. From a consideration of Table II, it may be seen that the signals applied to shift register 18′ are designed to maintain overall parity of the two shift register circuits. Thus, in the example shown in Table II, the total number of stages which are in the "1" state is always odd. Accordingly, when the number of "1's" is changed in shift register 16′, a corresponding change is made by an appropriate input signal to shift register 18′.

The Boolean algebraic expression for the circuit conditions described above is given in the following equations.

$$m=a'b+b'c' \qquad (1)$$

$$n=a'+bc' \qquad (2)$$

In the foregoing equations, the letters $m$ and $n$ represent the binary inputs to the shift registers 16 and 18, respectively. In addition, the letters $a$, $b$, and $c$ in the foregoing equations refer to the states of the stages in shift registers 16′ and 18′ of FIG. 2. The primed designations indicate the negation of the unprimed designations in accordance with the conventions of Boolean algebra. Thus, for example, if the stage $b$ were in the "0" state, the symbol $b'$ would represent the binary value "1."

Boolean algebraic expressions may readily be translated into logic circuitry. Such translations are described, for example, in an article by S. H. Washburn entitled "An Application of Boolean Algebra to the Design of Electronic Switching Circuits" which appeared in the A.I.E.E. Transactions, part I, Communications and Electronics, volume 72, September 1953. By way of example, products in Boolean algebraic expressions are instrumented by AND circuits and sums by OR circuits.

The functions indicated by Equations 1 and 2, respectively, are performed by the matrices designated 20′ and 22′ in FIG. 2. The matrix 20′ includes the two AND circuits 28 and 30 and the OR circuit 32. Similarly, the function indicated by Equation 2 is performed by the two AND circuits 34 and 36 and the OR circuit 38 in the logic matrix 22′. In passing, it may be noted that the input from the source of advance pulses forms one of the inputs for each of the AND circuits 28, 30, 34, and 36. These logic circuits are therefore slightly more complex than would be indicated by the simple Boolean algebraic expression of Equations 1 and 2.

The implementation of AND circuits, OR circuits, and the successive stages of a shift register is considered to be conventional at the present stage of the development of the art; however, typical circuits for performing these functions are disclosed in a text entitled "The Design of Switching Circuits" by William Keister et al., D. Van Nostrand Company, Inc., New York, 1951. In the circuit of FIG. 2, it may be noted that the inputs to the matrices 20′ and 22′ require the negated value of the state of various stages of the two shift registers, as well as their normal values. When shift register stages of the bistable multivibrator type are employed, the normal and inverted or negated values are available directly. However, when a dynamic form of storage is employed, suitable inversion circuits may be required for obtaining the logic quantities designated by the primed symbols in FIG. 2.

The parity check circuit of FIG. 3 is generally conventional, and includes many standard logic components. Specifically, it includes the AND circuits 40, 42, 44, 46, 48, 50, 52, and 54. It also includes the OR circuits 56, 58, and 60. Two inverting amplifiers 62 and 64 are also provided, in addition to a final output amplifier 66. When the number of energized stages in the shift registers 16′ and 18′ of FIG. 2 is odd, no signal appears at the output of the amplifier 66. If there should be an even number of stages in the "1" state, however, an alarm signal would immediately appear at the output of the amplifier 66.

FIG. 4 is a conventional AND circuit array for converting the signals stored in the five stages of the shift registers 16′ and 18′ of FIG. 2 into a decimal output. One and only one of the ten AND gates shown in FIG. 4 is energized upon the occurrence of each of the ten combinations of states of the two shift registers shown in Table II.

The logic circuit diagram of FIG. 5 shows the instrumentation of column D of Table I. FIG. 5 includes the shifts registers 16″, 18″ and the two input matrices 20″ and 22″. Table III set forth below indicates the successive binary sequences for sequence D in a manner corresponding to Table II for sequence F.

*Table III.—Sequence D*

| Indicated Decimal Output Number | Shift Register Pattern | | | | | Decimal Equivalent of Binary Word |
|---|---|---|---|---|---|---|
| | (16) *a* | (8) *b* | (4) *c* | (2) *d* | (1) *e* | |
| 0 | 0 | 0 | 0 | 0 | 1 | 1 |
| 1 | 0 | 1 | 0 | 1 | 1 | 11 |
| 2 | 1 | 0 | 1 | 1 | 0 | 22 |
| 3 | 0 | 1 | 1 | 0 | 1 | 13 |
| 4 | 1 | 1 | 0 | 1 | 0 | 26 |
| 5 | 1 | 0 | 1 | 0 | 1 | 21 |
| 6 | 0 | 0 | 0 | 1 | 0 | 2 |
| 7 | 0 | 0 | 1 | 0 | 0 | 4 |
| 8 | 0 | 1 | 0 | 0 | 0 | 8 |
| 9 | 1 | 0 | 0 | 0 | 0 | 16 |
| | Shift Register 18″ | | Shift Register 16″ | | | |

The Boolean algebraic expressions for the matrices 20″ and 22″ required to produce the pattern shown in Table III are as follows:

$$r=a'b'e+ae' \quad (3)$$

$$s=a'(c+d'e) \quad (4)$$

In the foregoing equations, $r$ and $s$ represent the input signals to the shift registers 16″ and 18″ from the matrices 20″ and 22″. As in the preceding example, the letters $a$ through $e$ correspond to the states of the five stages of the two shift registers. In the circuit of FIG. 5 enabling clock pulses are applied to the diodes 72 and 74 at the inputs to the first shift register stages $e$ and $b$ of registers 16′ and 18′. This is in contrast to the circuit of FIG. 2 in which the clock pulses were applied as inputs to each of the AND circuits of the input matrices. A suitable output matrix may be readily designed following the example of FIG. 4 to translate sequence D into decimal output signals.

As discussed above, the input matrices 22′ and 22″ to the shift registers 18′ and 18″ in FIGS. 2 and 5, respectively, are designed to provide a signal which maintains overall parity. Thus, when the input to shift register 16′ is different from its output signal, the input signal to shift register 18′ must also be different from its output signal. This logical requirement could be implemented directly, through the use of a matching circuit coupled to the input and output of shift register 16′. In addition, the resulting signal would be employed to selectively negate the signal coupled from the output of shift register 18′ to its input. Such a circuit could be employed at the input to both of the second shift registers 18′ and 18″ of FIGS. 2 and 5. However, the slightly simpler circuits shown at 22′ and 22″ in FIGS. 2 and 5 have been employed in these illustrative circuits.

It should be understood that the foregoing examples are merely illustrative of the principles of the invention. Specifically, more than two shift registers may be employed, shift registers of considerably greater length may be employed to represent a larger number of code groups or sequences, and even single-bit shift registers could be employed in combination with one or more additional shift registers, if desired. In the preferred form of my invention, however, at least two shift registers, each having at least two stages, are most satisfactorily employed in the realization of my invention.

It is to be understood that the above-described arrangements are illustrative of the application of the principles of the invention. Numerous other arrangements may be devised by those skilled in the art without departing from the spirit and scope of the invention.

What is claimed is:

1. In combination, a source of pulses to be counted, first and second shift registers each having a plurality of stages, means including first input logic circuit means coupled to said pulse source and individual stages of each of said shift registers for applying successive digits to the first shift register which digits are numerically related to digits shifted out of said first shift register, means including second input logic circuit means coupled to said pulse source and individual stages of each of said shift registers for applying successive digits to said second shift register which last-mentioned digits are numerically related to the digits shifted out of said second shift register in a parity correspondence with the shifting action in said first register, means for advancing digits in said first and second shift registers concurrently, an alarm circuit, means for checking the parity of the digits stored in all of the stages of both of said shift registers and for energizing said alarm circuit upon failure of parity, and an output circuit for selectively indicating the state of said two shift registers.

2. A parity checked counter circuit comprising first and second shift registers, means for applying successive digits to the first shift register which digits are numerically related to digits shifted out of the first shift register, means for applying successive digits to said second shift register which last-mentioned digits are related to the digits shifted out of said second shift register in a parity correspondence with the shifting action in said first register, means for advancing digits in said first and second shift registers concurrently, and means for checking the parity of the digits stored in all of the stages of both of said shift registers.

3. A parity checked counter circuit comprising first and second shift registers, first logic means for applying successive digits to the first shift register which digits are numerically related to digits shifted out of the first shift register, second logic means for applying successive digits to said second shift register which digits are numerically related to the digits shifted out of said second shift register in a parity correspondence with the shifting action in said first register to preserve parity in all of the stages of said two shift registers, and means for checking the parity of the digits stored in all of the stages of both of said shift registers.

4. In combination, a source of pulses to be counted, first and second shift registers, means including an input logic matrix coupled to said pulse source for applying successive digits to the first shift register which are numerically related to the digits shifted out of said first shift register, means including another input logic matrix coupled to said pulse source for applying successive digits to said second shift register which last-mentioned digits are numerically related to the digits shifted out of said second shift register in a parity correspondence with the shifting action in said first register, means for advancing digits in said first and second shift registers concurrently, and means for checking the parity of the digits stored in all of the stages of both of said shift registers.

5. A parity checked counter comprising a first shift register and a second shift register, each having an array of digit storage stages individually operable to digit states, means for shifting digits along said arrays of stages, first and second logic circuits controlled by the successive states of respective combinations of said digit storage stages to provide signals in accordance therewith, and means including said digit shifting means for applying said signals to the first stage of said first and second shift registers, respectively, for controlling the storage of distinctive digit code combinations in said shift registers for each count of the counter and for maintaining overall parity of the stages of said first and second shift registers.

6. In combination, a first shift register having an array of digit storage stages, a second shift register having an array of digit storage stages, each of said digit storage stages operable to a state indicative of a digit storage condition, input logic means connected to the first stages of said arrays and controlled by the states of certain of said stages of said first and second registers for controlling the storage of successive digits in said first stages of each of said first and second registers in accordance with predetermined code combinations to maintain overall parity of digits in said first and second registers, and means for applying advance pulses to said digit storage stages to advance said digits along said arrays of storage stages, said predetermined code combinations representing successive counts of said advance pulses.

7. A recycling counter circuit comprising a first shift register having an array of digit storage stages, a second shift register having an array of digit storage stages, each of said digit storage stages operable to a state indicative of a storage condition, input logic means connected to the first stages of said arrays and responsive to the states of certain of said stages of said first and second registers for controlling the succeeding state of at least one of said digit storage stages in each of said first and second registers in accordance with predetermined code combinations to maintain overall parity of digits in said first and second shift registers, means connecting each digit storage stage to the succeeding stage in said arrays but without connection of the last storage stage to the first storage stage in said arrays, and means for applying advance pulses to said digit storage stages to advance digits along said arrays of said storage stages, said predetermined code combinations representing successive counts of said advance pulses.

References Cited in the file of this patent

UNITED STATES PATENTS

| | | |
|---|---|---|
| 2,485,825 | Grosdoff | Oct. 25, 1949 |
| 2,696,599 | Holbrook et al. | Dec. 7, 1954 |
| 2,713,084 | Berwin | July 12, 1955 |
| 2,719,959 | Hobbs | Oct. 4, 1955 |
| 2,724,104 | Wild | Nov. 15, 1955 |
| 2,781,447 | Lester | Feb. 12, 1957 |
| 2,794,970 | Yostpile | June 4, 1957 |
| 2,894,684 | Nettleton | July 14, 1959 |
| 2,951,230 | Cadden | Aug. 30, 1960 |

OTHER REFERENCES

"Arithmetic Operations in Digital Computers" by R. K. Richards, Van Nostrand Co., 1955 (pp. 184, 187, 188).